Figure 1:
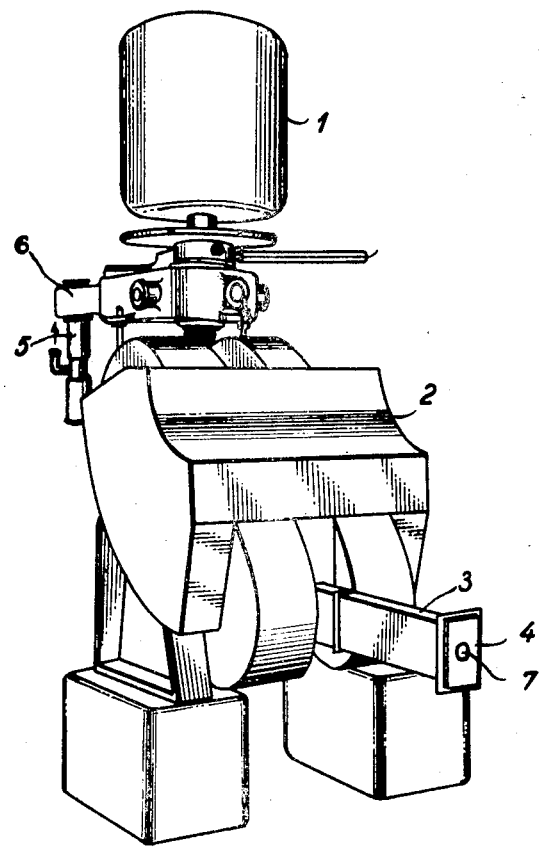

Feb. 22, 1955  J. KOCH  2,702,863
METHOD OF TREATING OPTICAL ELEMENTS
Filed July 12, 1949  2 Sheets-Sheet 1

JØRGEN KOCH
*INVENTOR.*
BY
*ATTORNEY*

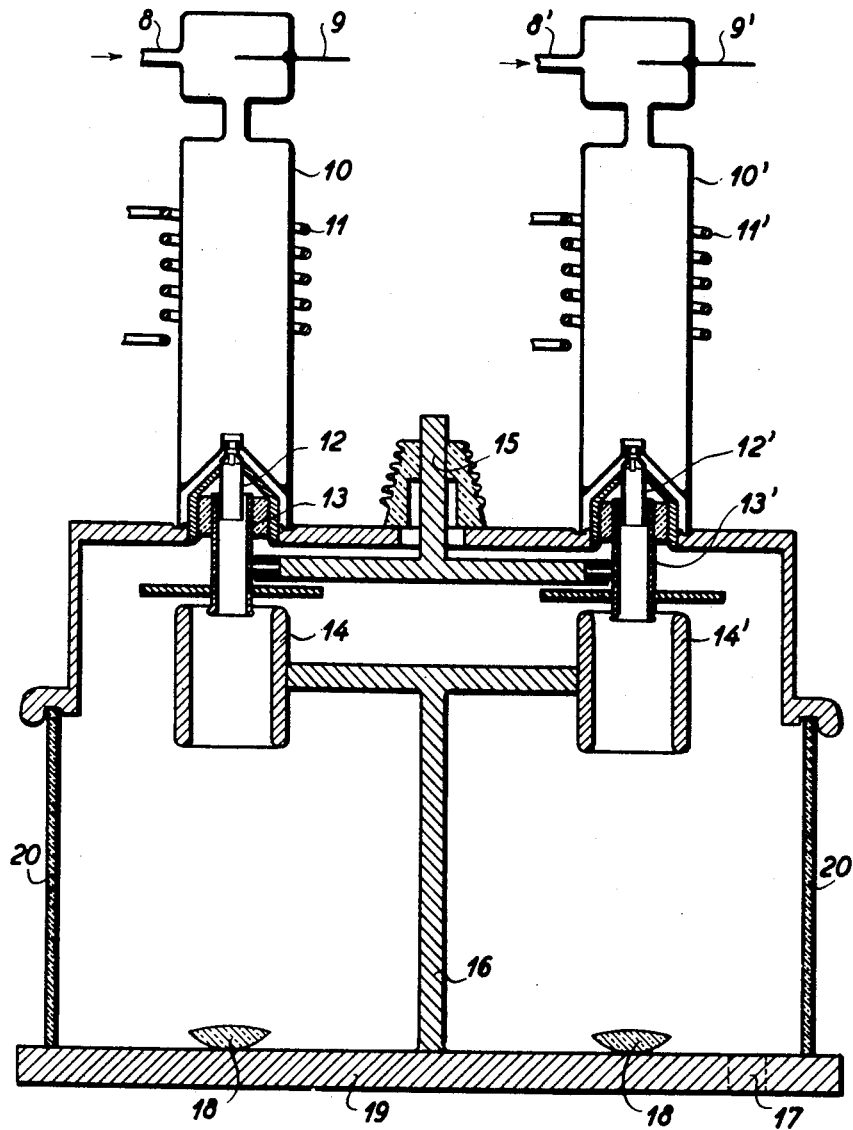

United States Patent Office 2,702,863
Patented Feb. 22, 1955

2,702,863

METHOD OF TREATING OPTICAL ELEMENTS

Jørgen Koch, Copenhagen, Denmark

Application July 12, 1949, Serial No. 104,232

1 Claim. (Cl. 250—49.5)

The invention relates to optical elements having surfaces with anti-reflection characteristics and to the method of producing the same.

In optical systems losses of light caused by reflection have to be taken into account when light passes from a medium with one index of refraction into a medium having another index of refraction. Even in common photographic objectives the total loss of transmitted light can be considerable, and in more complicated optical systems such as used, for example, in submarine periscopes, the total loss may reach 70 per cent.

Under prior art practices, the light transmission through lenses may be increased by applying to the lens surfaces thin, transparent coatings of certain materials, such as magnesium fluoride, which act to reduce the amount of light that is lost by reflection at the lens surfaces, as disclosed in United States Patent Reissue No. 22,076. Lenses and other optical elements which have been thusly treated are generally termed "coated optics" in this country and "T-Optik" in Germany. Such thin transparent coatings are usually applied to the surfaces of the optical elements by evaporation of the coating material in high vacuum.

One of the objects of this invention is to provide an improved optical element having a surface area which reduces the reflectance of light rays incident thereon. A further object is to provide an improved method for treating surfaces of optical elements so that the reflectance of light rays by the surfaces is reduced.

Another object of the present invention is to provide an improved method for treating the surfaces of optical glass elements whereby the treated surfaces will function to decrease the reflectance of incident light rays and will be as durable as the coated optics of the prior art but will have greater efficiency in reducing reflectance. Still another object of the invention is to produce a reflection-reducing layer integral with the optical element so as to avoid the necessity of adding a layer of material to the surface of the optical element.

The method according to the present invention is characterized by the bombardment of a fraction of, or the whole surface of the optical element by means of a beam of energetic particles, such as ions of atoms or molecules, at least a fraction of which penetrate into the surface. According to the invention the penetration of the ions into the surface of the optical element can result in a lasting change of the surface, which involves a decrease of the optical reflectance loss combined with an increase of the optical transmission through the element. Measurements have shown that surfaces of optical elements treated in accordance with this invention will produce a greater reduction in reflectance of light rays than the films deposited on the coated optics of the prior art.

Since not only the method but also the product is new, the invention further relates to an optical element, the reflection-reducing surface of which constitutes a resistant, integral part of the very element, and which, at least locally, has been treated with beams of fast particles in a way involving a reduction of the reflectance.

The invention is described further with reference to the drawing, in which Fig. 1 is a perspective view of a mass-spectrograph of a type known per se, and Fig. 2 a longitudinal sectional view through a combination of two ion sources of the well-known Thoneman type.

A corona shield 1 encloses a gas container from which the gas is introduced through valves into a low voltage ion source of the Lamar, Samson and Compton type comprising a hot cathode and an anode. The positive ions produced in the electric arc are drawn downwards by an electric accelerating field and collimated into a beam by means of an electrostatic lens system. The ion beam is deflected by a magnetic field from an electromagnet 2, so that a beam comprising one kind of ions only appears in the treatment area of the cross section of a tube 3. An optical element 7 may be placed in the tube 3 behind a removable glass window 4, which closes the tube 3 vacuum-tight. A low pressure is secured by means of a vacuum pump 5 and fore pumps, not shown, evacuating the gas through an outlet 6.

In experiments performed krypton was led into the ion source and pieces of crown-glass, flint glass and quartz were irradiated on both sides by krypton ions for about five hours. After about 10 minutes of irradiation a change in reflectance could be observed. The acceleration voltage was about 60 kv. and the current density about 10 micro-amperes per. $cm.^2$. Measurements by means of a spectrophotometer showed that the reflectance of the surface under treatment was decreased and the transmission increased to a greater extent than that obtained by the above-mentioned coating methods.

While the change which takes place in the surface of the optical element which has been treated in accordance with this invention is not understood, the treated surface exhibits the optical properties of a surface bearing an anti-reflection film of the prior art type above mentioned.

Under the prior art practice, anti-reflection films of magnesium fluoride are almost universally used on optical elements. While this material provides a relatively durable film, it does not produce the optimum reduction of reflectance because the refractive index of this material does not fully meet the theoretical requirements for optimum performance. Surfaces of plate glass which have been treated in accordance with this invention, however, constitute an improvement over the magnesium fluoride coated elements since the treated surfaces are not only durable but also function more efficiently so as to provide a greater reduction in reflectance of light rays.

Similar results can be obtained by using argon and xenon ions.

Magnetic deflection can be entirely avoided if the beam emitted from the ion source contains only ions of the gas introduced. In the above mentioned experiments such purity is obtained shortly after the insertion of a new glow cathode.

Several known types of ion sources can be used for the production of the ion beams and several ion sources of the same type can be used simultaneously for instance as shown in Fig. 2, where two Thoneman ion sources are shown in sectional view. Identical reference characters are used for identical parts in the two sources except for an index added to the reference characters in the source to the right.

The ion sources have glass envelopes 10, 10', with gas inlets 8, 8' and electrodes 9, 9' having a potential of +3000 volts with respect to electrodes 12, 12'. The ions are produced by the field originating from a high frequency current passing through coils 11, 11' surrounding the envelopes. The ions emitted from the sources are accelerated by means of still higher potentials applied between the electrodes 12, 12' and 13, 13' and the electrodes 12, 12' and 14, 14'. In practice 12, 12' may have a potential of +15 kv. with respect to 13, 13' and +50 kv. with respect to 14, 14'. The voltages are applied to the electrical conductors 15 and 16 and 12. The high voltage or high tension source is not shown. The whole apparatus is mounted on a metal base 19 and a glass cylinder 20 is used as an insulator for the high tension. Vacuum pumps connected to an outlet 17 evacuate the system.

In operation two ion beams will be directed downwards onto lenses 18, 18' consisting of quartz, glass, or the like, placed on the base 19. Lenses 18 and 18' can be introduced through suitable gates, not shown.

Another ion source which can be used for the production of the ion beams is the well-known high tension ion source by oliphant. This ion source consists of two coaxially mounted metal cylinders having a potential difference of 30–60 kv. The energetic ions are emitted through a hole in the bottom of the outer cylinder in a non-monoenergetic beam which can be directed against the surface of the optical element to be treated. The optical element can also be placed inside the cylinders of this ion source. Other gaseous discharge devices of similar properties can be used in treating optical elements in accordance with the invention.

The reflection-reducing layer of the optical elements treated according to the invention is a resistant layer formed by a change, at least in the physical respect, of the surface material of the element and is not an extra additional surface layer. It may be mentioned that an optical element treated according to the invention has proved resistant in a concentrated acid, such as, for example, nitric acid or chromic sulphuric acid. When subjected to abrasion tests, it was found that the mechanical properties of the treated surfaces produced by this invention were of about the same order as those of the prior art coated surfaces.

Although by the method of the invention a reduction of the reflectance combined with an increase of the transmission is obtained, the invention is also significant in cases where only one of these properties is of primary importance. Single reflection, double reflection, or multiple reflection can, for instance in photography, give rise to a halation and thus involve a blurring of the image.

The lack of definition of the image on the screen of a cathode-ray tube is partly due to double reflection from the surface of the glass wall. In this case, the optical element is not used as an image-forming element, but serves only as a transparent support of the phosphor. However, the optical element need neither be an image-forming nor a supporting element, but can function simply as a wall, for instance forming a window between two chambers.

The great stability of the reflection-reducing layer formed by the present invention makes it possible to use optical elements with low reflection in places where it has previously been impossible to use them, because of the possible damaging action either of other substances on the layer or vice versa. Thus, the reflection-reducing surface layers of the prior art, usually containing fluorine compounds, can hardly be applicable to medical instruments or to the so-called invisible spectacles or contact lenses which are worn directly on the eye-ball under the eye-lid.

The use of electrically charged particles in the production of low reflective surfaces of optical elements involves different advantages. The doses of irradiation can, for example, be determined by simple measurements of current and voltage, and, besides, it is possible to direct the beam towards or sweep it over certain parts of the object treated, for example, by the application of electric or magnetic deflection. A meticulous preliminary cleaning of the surface of the optical element which is essential in coating methods of the prior art, is not necessary in the practice of this invention because the beam cleans the surface.

The invention is not limited to the examples described. The effect aimed at can be obtained with different sorts of energetic particles, different voltages of acceleration, different current densities and times of exposures, and it can be applied to different objects too, all depending on the amount and type of change in the surface to be produced. In cases in which only a fraction of the surface of an optical element is to be treated, a diaphragm with suitable apertures and applied potential can be placed over it as a screen.

I claim:

A method of treating the surface of a glass optical element in order to reduce the reflection of light rays by the surface which comprises bombarding the surface with krypton ions under an acceleration voltage of about 60 kv. and at a current density of about 10 micro-amperes per square centimeter for a period of at least 10 minutes.

References Cited in the file of this patent

UNITED STATES PATENTS

| | | |
|---|---|---|
| 1,735,302 | Slack | Nov. 12, 1929 |
| 1,948,384 | Lawrence | Feb. 20, 1934 |
| 1,991,279 | Holst | Feb. 12, 1935 |
| 2,239,642 | Burkhardt et al. | Apr. 22, 1941 |
| 2,373,639 | Turner | Apr. 10, 1945 |
| 2,383,469 | Colbert et al. | Aug. 28, 1945 |
| 2,420,724 | Rice | May 20, 1947 |
| 2,428,868 | Dimmick | Oct. 14, 1947 |
| 2,442,493 | Heyn | June 1, 1948 |